(12) United States Patent
Denolf

(10) Patent No.: US 8,594,186 B1
(45) Date of Patent: Nov. 26, 2013

(54) DIGITAL VIDEO CODING USING QUANTIZED DC BLOCK VALUES

(75) Inventor: Kristof Denolf, Bruges (BE)

(73) Assignee: Xilinx, Inc., San Jose, CA (US)

(*) Notice: Subject to any disclaimer, the term of this patent is extended or adjusted under 35 U.S.C. 154(b) by 1826 days.

(21) Appl. No.: 11/711,435

(22) Filed: Feb. 27, 2007

(51) Int. Cl.
- H04N 7/12 (2006.01)
- H04N 11/02 (2006.01)
- H04N 11/04 (2006.01)

(52) U.S. Cl.
USPC ............ 375/240.03; 375/240.02; 375/240.12; 375/240.13; 375/240.14; 375/240.15; 375/240.16; 375/240.22

(58) Field of Classification Search
USPC .................................... 375/240.03
See application file for complete search history.

(56) References Cited

U.S. PATENT DOCUMENTS

| | | | | |
|---|---|---|---|---|
| 6,047,089 A | * | 4/2000 | Abe | 382/250 |
| 6,215,905 B1 | * | 4/2001 | Lee et al. | 382/238 |
| 6,754,269 B1 | * | 6/2004 | Yamaguchi et al. | 375/240.1 |
| 2006/0188164 A1 | * | 8/2006 | Lee et al. | 382/238 |
| 2006/0222250 A1 | * | 10/2006 | Youn | 382/236 |

* cited by examiner

*Primary Examiner* — Kambiz Zand
*Assistant Examiner* — Narciso Victoria
(74) *Attorney, Agent, or Firm* — W. Eric Webostad; LeRoy D. Maunu

(57) ABSTRACT

Digital signal processing and, more particularly, digital video coding is described. Video encoding or decoding of frames includes accessing a plurality of values that can include at least one quantized DC default value and a plurality of quantized DC block values for neighboring blocks with respect to an intra block. A direction of change for the intra block is determined using predictor values obtained from the accessed values.

20 Claims, 5 Drawing Sheets

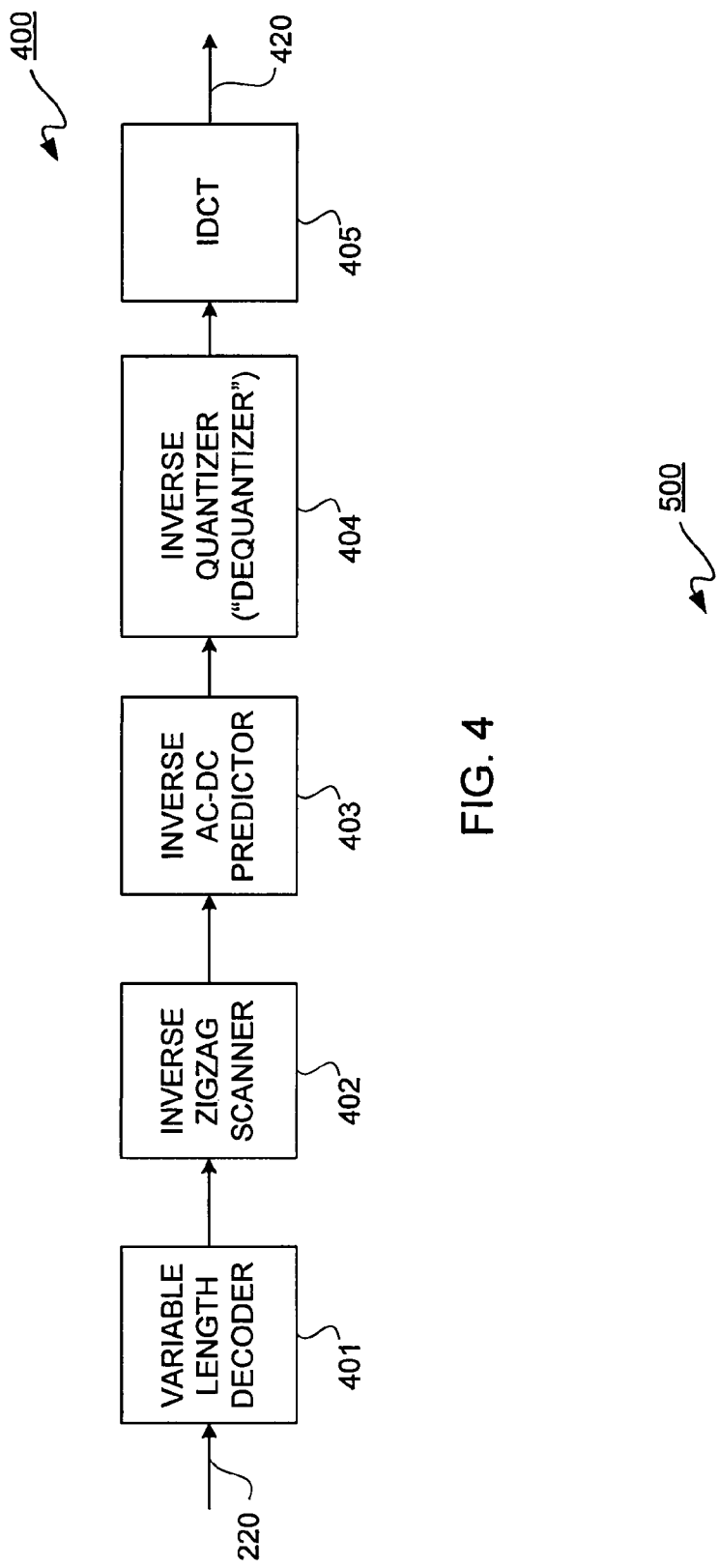

DIGITAL VIDEO CODING USING QUANTIZED DC BLOCK VALUES

FIELD OF THE INVENTION

One or more aspects of the invention relate generally to digital signal processing and, more particularly, to digital video coding.

BACKGROUND

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. Notably, as used herein, "include" and "including" mean including without limitation.

One such FPGA is the Xilinx Virtex® FPGA available from Xilinx, Inc., 2100 Logic Drive, San Jose, Calif. 95124. Another type of PLD is the Complex Programmable Logic Device ("CPLD"). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. Other PLDs are programmed by applying a processing layer, such as a metal layer, that programmably interconnects the various elements on the device. These PLDs are known as mask programmable devices. PLDs can also be implemented in other ways, for example, using fuse or antifuse technology. The terms "PLD" and "programmable logic device" include but are not limited to these exemplary devices, as well as encompassing devices that are only partially programmable.

For purposes of clarity, FPGAs are described below though other types of PLDs may be used. FPGAs may include one or more embedded microprocessors. For example, a microprocessor may be located in an area reserved for it, generally referred to as a "processor block."

Recently, FPGAs have been used for digital video processing. In order to more conveniently send video over limited bandwidth networks, video compression is used. There are many known types of video compression, including that associated with Motion Pictures Expert Group ("MPEG"), among others. For purposes of clarity by way of example and not limitation, MPEG compression and decompression is described below, although other types of compression may be used.

Generally, a video sequence includes a number of pictures or frames. Frames in a sequence may be substantially similar, and thus contain a significant amount of redundant information. In video compression, this redundant information may effectively be removed by using a reference frame and a number of residual frames. As residual frames are indexed to a reference frame, they may contain less information than the reference frame. Accordingly, they may be encoded at a lower bit rate with the same quality as the original frames from which they were obtained.

In MPEG, frames are processed in groups of pictures ("GOPs"). A reference frame, which is an intracoded frame ("I-frame" or "I-picture") is combined with predicted frames ("P-frames or P-pictures"). One or more P-frames may be predicted from a preceding I-frame or P-frame. Furthermore, frames may be predicted from future frames. Such predicted frames from future frames may be predicted from two directions, such as for example from an I-frame and a P-frame that respectively immediately precede and follow the bidirectionally predicted frame. Conventionally, bidirectionally predicted frames are called "B-frames" or "B-pictures."

Frames may be partitioned into blocks, each of which is an array of pixels. These blocks may be grouped together in what is sometimes referred to as a "macroblock." Groups of macroblocks, where each group is associated with a frame, are known as "slices." Each block is predicted from a block of equal size in a reference frame. Blocks are not transformed apart from the original frame other than being shifted to a position of a predicted block.

For intra-frame blocks ("intra blocks"), conventional AC-DC prediction has been used, such as specified by MPEG. In MPEG, a block is a matrix of 8-by-8 pixels, which may be a either adjacent luminance or chrominance samples, or corresponding DCT coefficients as is known. A block may be coded to represent an image sample, namely an intra block, or may be coded to represent a prediction-error, namely an inter block or non-intra block. Examples of inter blocks include blocks coded for motion compensation or motion estimation. For example, to lower energy residue of a frame, such as an I-frame, P-frame, or B-frame, AC-DC prediction may be used to predict either a first column or a first row of an intra block. Thus, correlation in a frequency domain may be exploited to predict either a first column or a first row of an intra block by using one or more neighboring intra blocks of the same slice. Other details regarding MPEG video encoding and decoding are not described, as they are well known.

MPEG-4 is for low bandwidth applications, such as for approximately 64 kilobits per second for example. Applications generally associated with MPEG-4 include video associated with portable wireless devices. These devices tend to have significant power consumption limitations and space limitations. Furthermore, portable wireless devices may have significant limitations on computing capability, and may be significantly constrained with respect to real-time handling of video decoding at a system clock rate. Examples of MPEG-4 decoders include the Mobile Multimedia Systems ("MoMuSys") reference decoder published by the International Organization for Standardization ("ISO"). The MoMuSys reference decoder is capable of handling any MPEG-4 Natural Video stream, including multiple video streams. A Simple Profile, as well as an Advanced Simple Profile, is a subset of MPEG-4 Natural Video. Moreover, others have suggested implementing MPEG-4 encoders in programmable logic of FPGAS, such as an MPEG-4 Simple Profile encoder available from Barco-Silex of Belgium (www.barcodesignservices.com).

Accordingly, it would be desirable and useful to provide a less complex form of AC-DC prediction for low bandwidth video. Furthermore, it would be desirable and useful to provide a form of AC-DC prediction that would be reasonable for implementation in an FPGA or other integrated circuit.

SUMMARY

One or more aspects of the invention generally relate to digital signal processing and, more particularly, to digital video coding.

An aspect of the invention relates generally to a method for video encoding or decoding of frames. Two or more values are accessed that can include at least one quantized DC default value and quantized DC block values for neighboring blocks with respect to an intra block. A direction of change for the intra block is determined using predictor values obtained from the accessed values.

Another aspect of the invention relates generally to a decoder for moving picture decoding. Storage has quantized block DC values for blocks of slices associated with frames and quantized default DC values. An inverse AC-DC predictor is configured to receive predicted quantized values in a frequency domain and in response thereto to provide quantized values in the frequency domain, the predicted quantized values being associated with an intra block. The inverse AC-DC predictor is configured at least in part to: obtain a first quantized DC block value, a second quantized DC block value, and a third quantized DC block value from the quantized block DC values respectively associated with nearest neighbor blocks of the intra block; determine a first absolute value difference between the first quantized DC block value and the second quantized DC block value; determine a second absolute value difference between the second quantized DC block value and the third quantized DC block value; select a nearest neighbor block from a portion of the nearest neighbor blocks responsive to whether the first absolute value difference is less than the second absolute value difference indicating a predictable change in direction in the frequency domain; reconstruct a quantized DC value for the intra block by adding either the first quantized DC block value or the third quantized block value responsive to the nearest neighbor block selected to a predicted quantized DC value of the predicted quantized values; and reconstruct quantized AC values for the intra block by adding quantized AC block values for either a bordering row or a bordering column of the nearest neighbor block selected for either a first row or a first column, respectively, of predicted quantized AC values of the predicted quantized values without having to perform a division operation responsive to a fixed quantization parameter of either a slice or a frame in which the intra block is located.

Yet another aspect of the invention is an encoder for moving picture encoding. Storage has quantized block DC values for blocks of slices associated with frames and quantized default DC values. An AC-DC predictor is configured to receive quantized values in a frequency domain and in response thereto to provide predicted quantized values in the frequency domain, the predicted quantized values being for an intra block. The AC-DC predictor is configured at least in part to: obtain a first quantized DC block value, a second quantized DC block value, and a third quantized DC block value from the quantized block DC values respectively associated with nearest neighbor blocks to the intra block; determine a first absolute value difference between the first quantized DC block value and the second quantized DC block value; determine a second absolute value difference between the second quantized DC block value and the third quantized DC block value; select a nearest neighbor block from a portion of the nearest neighbor blocks responsive to whether the first absolute value difference is less than the second absolute value difference indicating a predictable change in direction in the frequency domain; generate a predicted quantized DC value for the intra block by subtracting either the first quantized DC block value or the third quantized block value responsive to the nearest neighbor block selected from a quantized DC value of the intra block; and generate predicted quantized AC values for the intra block by subtracting quantized AC block values for either a bordering row or a bordering column of the nearest neighbor block selected to either a first row or a first column of quantized AC values, respectively, of the intra block without having to perform a division operation responsive to a fixed quantization parameter of either a slice or a frame in which the intra block is located.

BRIEF DESCRIPTION OF THE DRAWINGS

Accompanying drawings show exemplary embodiments in accordance with one or more aspects of the invention; however, the accompanying drawings should not be taken to limit the invention to the embodiments shown, but are for explanation and understanding only.

FIG. 4 is a block diagram depicting an exemplary embodiment of a video texture decoder for decoding/decompressing encoded/compressed data generated as described with reference to FIGS. 2 and 3.

FIG. 5 is a block diagram depicting an exemplary embodiment of four neighboring macroblocks 500 of a frame, such as a I-, P-, or B-frame.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
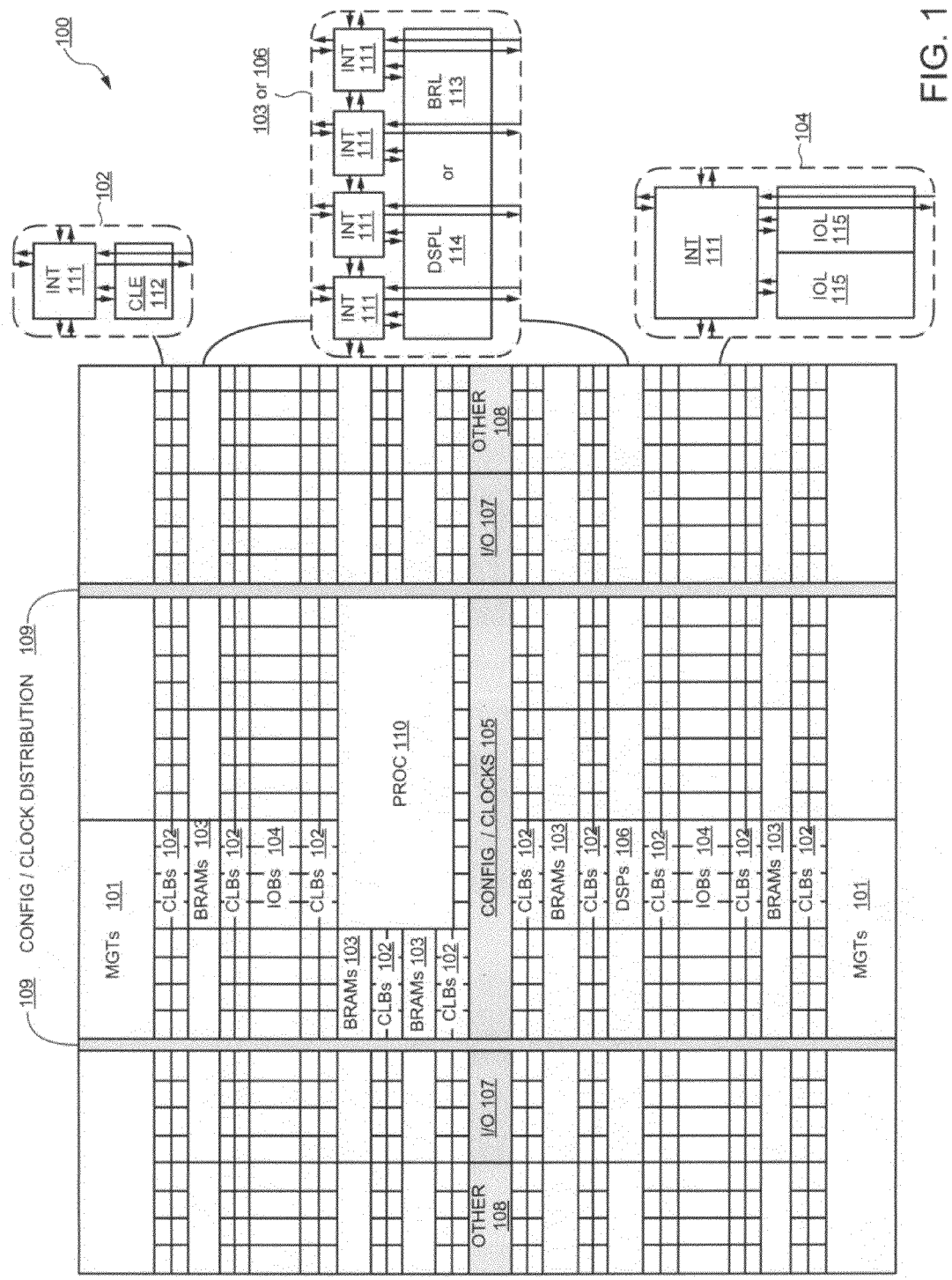
FIG. 1 is a simplified block diagram depicting an exemplary embodiment of a columnar Field Programmable Gate Array ("FPGA") architecture in which one or more aspects of the invention may be implemented.

FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output ports ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element 111 in each adjacent tile. Therefore, the programmable interconnect elements 111 taken together implement the programmable interconnect structure for the illustrated FPGA. Each programmable interconnect element 111 also includes the connections to and from any other programmable logic element(s) within the same tile, as shown by the examples included at the right side of FIG. 1.

For example, a CLB 102 can include a configurable logic element ("CLE") 112 that can be programmed to implement user logic plus a single programmable interconnect element 111. A BRAM 103 can include a BRAM logic element ("BRL") 113 in addition to one or more programmable interconnect elements 111. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element ("DSPL") 114 in addition to an appropriate number of programmable interconnect elements 111. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 are manufactured using metal layered above the various illustrated logic blocks, and typically are not confined to the area of the I/O logic element 115.

In the pictured embodiment, a columnar area near the center of the die (shown shaded in FIG. 1) is used for configuration, I/O, clock, and other control logic. Vertical areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the right side of FIG. 1 are purely exemplary. For example, in an actual FPGA more than one adjacent column of CLBs is typically included wherever the CLBs appear, to facilitate the efficient implementation of user logic. FPGA 100 illustratively represents a columnar architecture, though FPGAs of other architectures, such as ring architectures for example, may be used. FPGA 100 may be a Virtex-4™ or Virtex-5™ FPGA from Xilinx of San Jose, Calif.

Figure 2:
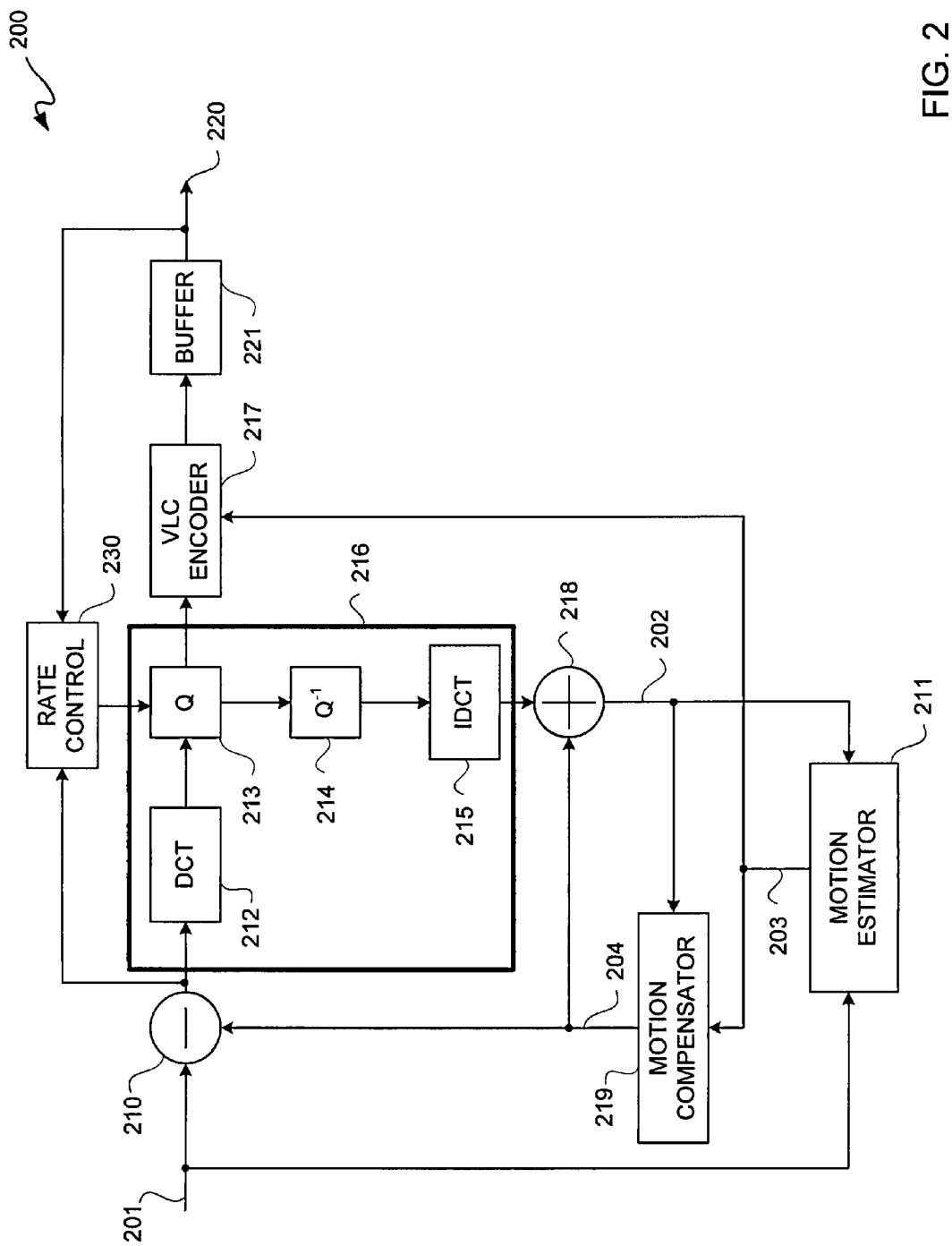
FIG. 2 is a block diagram depicting an exemplary embodiment of a hybrid video coder/decoder ("CODEC").

FIG. 2 is a block diagram depicting an exemplary embodiment of a hybrid video coder/decoder ("CODEC"). CODEC 200 may be configured to exploit both temporal and spatial redundancy in moving pictures to facilitate compression. If no sufficiently strong temporal correlation is found, spatial redundancy may be exploited in a Discrete Cosign Transform ("DCT") and by use of intraframe prediction.

New frame data input 201 is provided to a data input port of subtractor 210 and to a data input port of motion estimator 211. Output of subtractor 210 is provided to a data input port of DCT block 212. DCT block 212, quantizer ("Q") 213, inverse quantizer ("Q$^{-1}$") 214, and Inverse Discrete Cosign Transform ("IDCT") block 215 may all be part of a texture coding block 216.

Output of DCT block 212 is provided as an input to quantizer 213. Output of quantizer 213 is provided as an input to variable length coding ("VLC") encoder 217 and as an input to inverse quantizer 214. Output of inverse quantizer 214 is provided as an input to IDCT block 215. Output of IDCT block 215 is provided to a data input port of adder 218.

Output of adder 218 is provided as an input to motion compensator 219 and as a data input to motion estimator 211. Output of adder 218 is reconstructed frame data 202.

Output of motion estimator 211 responsive to reconstructed frame data 202 and new frame data 201 produces motion vector data 203. Motion vector data 203 is provided as data input to motion compensator 219 and VLC encoder 217.

Output of motion compensator 219 is responsive to motion vector data 203 and reconstructed frame data 202. Output of motion compensator 219 is predictive frame data 204. Predictive frame data 204 is provided as data input to adder 218 and to subtractor 210. Responsive to predictive frame data 204 and new frame data 201, subtractor 210 provides an output as a data input to DCT block 212 of texture coding block 216, and to rate control block 230.

Responsive to output from quantizer 213 and motion vector data 203, VLC encoder 217 provides encoded or compressed video data as an output, which may be buffered by buffer 221 for providing buffered encoded data 220. Notably, VLC encoder 217 is described in more detail below with reference to FIG. 3. Output of buffer 221 may be provided as a data input to rate control block 230. Output of rate control block 230 may be provided as an input to quantizer 213. Notably, inverse quantizer 214 and IDCT block 215 are components of a decode path of CODEC 200. Other decode components described below with reference to FIG. 4 may be included as part of CODEC 200, but are not illustratively shown in FIG. 2 for purposes of clarity. Thus, output of IDCT block 215 may be decoded data.

Figure 3:
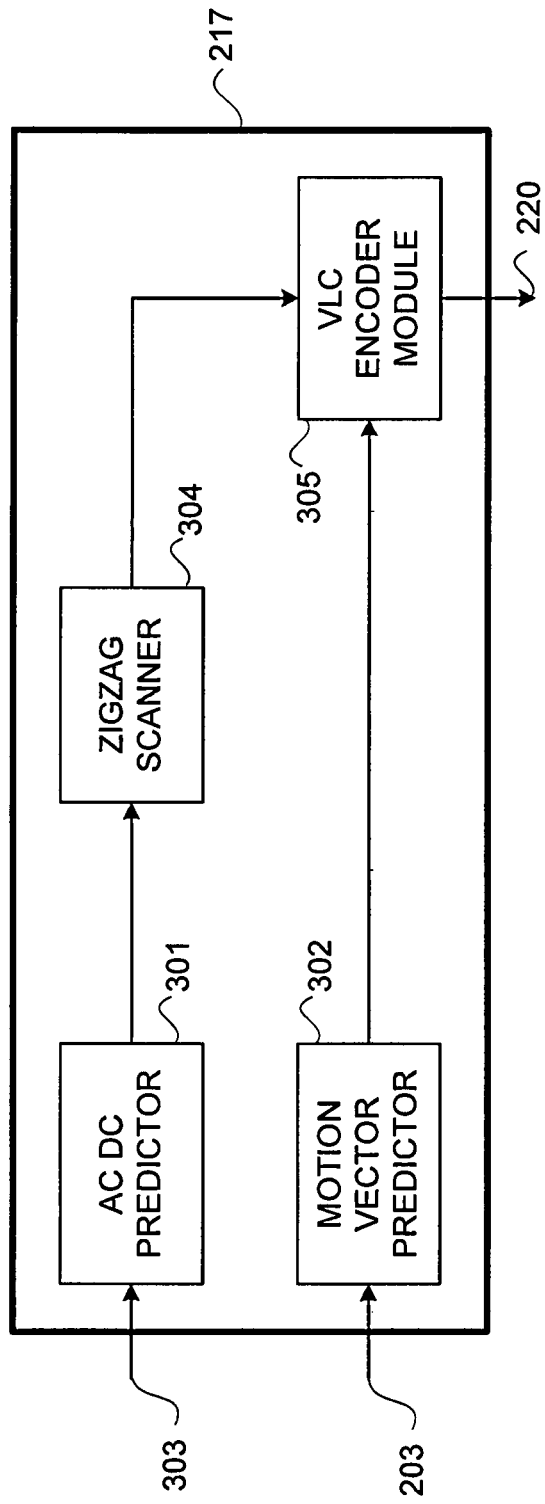
FIG. 3 is a block diagram depicting an exemplary embodiment of a variable length coding ("VLC") encoder for a Motion Pictures Expert Group ("MPEG") implementation.

FIG. 3 is a block diagram depicting an exemplary embodiment of VLC encoder 217 of FIG. 2 for a Motion Pictures Expert Group ("MPEG") implementation, and more particularly, for an MPEG-4 Part 2 VLC encoder. Quantized values 303, which may be output from quantizer 213 of FIG. 2, are provided as data input to AC-DC predictor 301. AC-DC predictor 301, zigzag scanner 304, motion vector predictor 302, and VLC encoder module 305 may all be part of VLC encoder 217. Notably, it should be appreciated that VLC encoder 217 may be what is commonly referred to as an Entropy Encoder.

AC-DC predictor 301 is used for intraframe prediction as part of an MPEG-4 Part 2 video CODEC specification. Prediction is applied to quantized coefficients, such as coefficients output from DCT block 212 of FIG. 2, in a frequency domain, and accordingly, quantized input 303 may be expressed as QF[x][y], where Q indicates quantized values, such as Most Significant Bits ("MSBs"), F indicates frequency domain, and [x][y] indicate matrix coordinates of pixel data in a frame.

Motion vector data ("MV") 203 input to motion vector predictor 302 accordingly may be mathematically expressed as MV[x][y]. Output of AC-DC predictor 301 and output of motion vector predictor 302 may each be mathematically expressed with a P to indicate prediction, namely respective outputs PQF[x][y] and PMV[x][y].

Output of AC-DC predictor 301 is provided as an input to zigzag scanner 304. Output of zigzag scanner 304 is a sequence of a matrix of n scanned values, which may be mathematically expressed as QFS[n], where S indicates scanning and n is an integer greater than zero. Output of zigzag scanner 304 and output of motion vector predictor 302 are provided as respective data inputs to VLC encoder module 305. Output of VLC encoder module 305 responsive to these inputs is encoded data 220.

FIG. 4 is a block diagram depicting an exemplary embodiment of a video texture decoder 400 for decoding/decompressing encoded/compressed data, such as encoded data 220, which is generated as described with reference to FIGS. 2 and 3. Texture decoder 400 may form part of texture coding block 216 of FIG. 2. Encoded data 220 is provided as a data input to variable length decoder 401. Output of variable length decoder 401 may be mathematically expressed as QFS[n]. Output of variable length decoder 401 is provided to inverse zigzag scanner 402. Output of inverse zigzag scanner 402 may be mathematically expressed as PQF[y][x]. Output of inverse zigzag scanner 402 may be provided as a data input to inverse AC-DC predictor 403. Output of inverse AC-DC predictor 403 may be mathematically expressed as QF[y][x]. Output of inverse AC-DC predictor 403 may be provided to inverse quantizer or dequantizer 404. Output of inverse quantizer 404 may be mathematically expressed as F[y][x]. Output of inverse quantizer 404 may be provided as a data input to IDCT block 405. Output of IDCT block 405 may be decompressed or decoded data 420. Decoded data 420 may be mathematically expressed as f[y][x], where f indicates time domain. Notably, inverse quantizer 404 and IDCT block 405 may respectively be inverse quantizer 214 and IDCT block 215 of FIG. 2.

FIG. 5 is a block diagram depicting an exemplary embodiment of a set of four neighboring macroblocks 500 of a frame, such as an I-, P-, or B-frame. It should be appreciated that blocks 501 through 504 may be respective macroblocks in a slice of a frame, such as an I-, P- or B-frame for an MPEG implementation. For purposes of clarity and not limitation, the description that follows, though using the term "block" instead of "macroblock," is directed at an MPEG-4 implementation, even though other types of hardware implementations may be used. In this example, there are blocks A 501 ("block A") block B 502 ("block B"), block C 503 ("block C"), and block X 504 ("block X"). Predicting values, namely AC-DC prediction, for block X may be done using a neighboring block. Which neighboring block used depends on a selection criteria in the frequency domain. Thus, for example, either of blocks A or C may be used for AC-DC prediction of block X in this example.

The selection criteria in the frequency domain is set forth as Equation (1).

$$(|F_A[0][0] - F_a[0][0]| < |F_B[0][0] - F_C[0][0]|) \quad (1)$$

Equation (1) is used to compare the DC value of surrounding blocks, such as blocks A, B, and C, to block X, which is under prediction, to determine direction of such prediction. As set forth in Equation (1), $F_A$ for example is for the frequency domain for block A. As the DC value is being evaluated, both x and y are each 0. The absolute value of the DC value of block B subtracted from the DC value of block A in the frequency domain yields a result, which may be less than the absolute value of the difference between the DC value of block C subtracted from the DC value of block B in the frequency domain. If the inequality of Equation (1) is true, then prediction for block X is based on use of block A. If, however, the inequality of Equation (1) is not true, then the prediction of block X is done using block C. Accordingly, Equation (1) may be implemented as an if-then-else operation.

To reconstruct the quantized DC value in the frequency domain for block X, Equation (2) may be used as follows:

$$QF_x[0][0] = PQF_x[0][0] + \frac{F_{A,C}[0][0]}{dc\_scaler} \quad (2)$$

Notably, the DC scaler ("dc_scaler") in Equation (2) is described below in additional detail. Also, it should be appreciated that $F_{A,C}[0][0]$ indicates that either the DC value for block A or block C in this example is to be used in Equation (2). For example, if the inequality of Equation (1) is true, then the DC value of block A is used in Equation (2), and if the inequality of Equation (1) is not true, then the DC value of block C is used in Equation (2). The predicted quantized DC value for block X in the frequency domain, $PQF_X[0][0]$ is described below in additional detail. However, it should be appreciated that by rewriting Equation (2), $PQF_X[0][0]$ may be determined from $QF_X[0][0]$ less $F_{A,C}[0][0]/dc\_scaler$. Thus, either or both decoding or encoding may be done. For now, for purposes of clarity by way of example and not limitation, it will be assumed that encoding is done even though many of the equations are written for decoding. However, from the following description one of ordinary skill in the art shall appreciate that either or both encoding or decoding may be implemented.

If neighboring blocks A through C for the evaluation of Equation (1) are present in the same slice, and thus are associated with the same frame as block X, then prediction may be done using data from either block A or C. If however, the surrounding blocks for evaluation of Equation (1) are in another slice associated with the same frame, or are outside the frame entirely, a default value of $2^{(b+2)}$ may be used where b indicates the number of bits per pixel.

Notably, if less than all three neighboring blocks used in Equation (1) are not available, such as one or more of them being in another slice or are outside of the frame associated with block X, a default value may be used for the block or blocks that are not available in combination with the neighboring block or blocks that are available. For example, suppose blocks B and C are not available, then a default value of $2^{(b+2)}$ may be used for the DC value of each of the missing blocks B and C. Furthermore, AC values for such unavailable blocks may be set to 0.

Assuming that the neighboring blocks to block X are in the same slice, and thus in the same frame, Equation (3a) may be used if block X is predicted from block A responsive to the inequality of Equation (1) being true, and Equation (3b) may be used responsive to the inequality of Equation (1) being not true, where Equations (3a) and (3b) respectively are:

$$QF_x[y][0] = PQF_x[y][0] + \frac{QF_A[y][0] \cdot QP_A}{QP_x} \quad (3a)$$

$$QF_x[0][x] = PQF_x[0][x] + \frac{QF_C[0][x] \cdot QP_C}{QP_x} \quad (3b)$$

Equations (3a) and (3b) may be implemented as an if-then-else operation. Whether quantized AC values of a row or a column are used depends on the outcome of Equation (1), such as whether block A or block C is used. Thus, quantized AC values may be reconstructed responsive to either Equation (3a) or (3b) for selection of block A or C, respectively. For example, for an 8-bit-depth limit for both x and y, where the 0 bit is for DC, AC values for Equation (3a) may be determined by incrementing y from one through to seven (1, 2, . . . , 7), and for Equation (3b), may be determined by incrementing x from one through to seven. Notably, the instances where y equals 0 or x equals 0 in Equations (3a) and (3b), respectively, are not present, as a DC value for use of block A or block C is determined at Equation (2).

In applications where the quantization parameter for a block X, namely $QP_X$ in Equations (3a) and (3b), is only allowed to change on a per frame or per slice basis, Equations (3a) and (3b) may be respectively rewritten as Equations (4a) and (4b).

$$QF_X[y][0] = PQF_X[y][0] + QF_A[y][0] \quad (4a)$$

$$QF_X[0][x] = PQF_X[0][x] + QF_C[0][x] \quad (4b)$$

By not allowing quantization to change within a frame or within a slice of a frame associated with block X, it should be appreciated that the quantization parameter for AC-DC prediction for block X will be equivalent to the quantization parameter for the neighboring block used to predict values for block X. For example, if block A is selected, then $QP_A$ is equivalent to $QP_X$ in Equation (3a). Thus, Equation (3a) may be rewritten as Equation (4a). Moreover, if block C is used for AC-DC prediction of block X, then $QP_C$ is equivalent to $QP_X$ in Equation (3b), and thus Equation (3b) may be rewritten as Equation (4b). Notably, equations (4a) and (4b) may be implemented as an if-then-else operation.

It should be appreciated that in implementing Equations (4a) and (4b), prediction of coefficients involving both quantized and non-quantized values is simplified to avoid having to implement a divider. Accordingly, the hardware implementation of Equations (4a) and (4b) is less complex than the hardware implementation of Equations (3a) and (3b), as a divider may be replaced by shifts accompanied by use of a look-up table.

For example, for an MPEG-4 Part 2 Simple Profile only an 8-bit bit depth is allowed, namely the pixel depth which is b in Equation (5b) below. Furthermore, for an MPEG-4 Part 2 Simple Profile x and y each range from bit positions 0 through 7, and the QP parameter lies in a range of [1 . . . 31]. For purposes of clarity by way of example and not limitation, it shall be assumed that an MPEG-4 Part 2 Simple Profile is implemented, even though it should be appreciated that other types of implementations may be used. Furthermore, for this MPEG-4 Part 2 Simple Profile, it should be appreciated that default DC values are in a range of [712 . . . 4096], which means 13 bits are used to represent DC default values. Furthermore, the range of a dc_scaler, for both luminance and chrominance, is [8:46], meaning a look-up table of 33 elements may be implemented. To address such a look-up table, the dc_scaler may have subtracted from it the value of eight to provide an address for addressing the elements of the look-up table.

To predict the direction of change of pixel information in the frequency domain, neighboring intra blocks may be used. Such intra blocks may be part of a frame, such as an I frame or a P frame. It should be appreciated that in those instances where there are no intra blocks available, such as when the intra block under prediction is at the border of a neighboring frame, or when the neighboring blocks are coded as inter blocks for example, a default DC value may be used. Furthermore, it should be appreciated that $QP_X$ is set to a fixed value with respect the frame or slice of interest, namely the frame or the slice of a frame currently being processed.

Thus, to simplify the prediction process, quantized default values may be pre-calculated and stored in a look-up table. Notably, a look-up table may be instantiated in RAM or ROM. The quantized DC values for neighboring blocks may be calculated as part of an encoding or decoding operation and then stored, such as in RAM, for supporting DC prediction. Furthermore, in those instances where one or more DC default values are to be used for the DC prediction, such DC default values may be scaled or quantized to correspond with the quantization of DC values of neighboring intra blocks. Thus, for example the quantized default DC value may be set equal to $2^{(b+2+\alpha)}$ (2 to the power of (b+2+α)) divided by the dc_scaler used to determine DC values for neighboring intra blocks. Notably, a indicates a fixed offset or bit precision. More particularly, a indicates a fixed degree of pointing. By setting α for a minimum fixed precision such that a correct evaluation for selection of which neighboring intra block is to be selected, fewer bits may be processed.

Accordingly, Equation (5a) may be used to calculate DC values for neighboring blocks A and C, as follows:

$$QF_{A,C}[0][0] = \frac{F_{A,C}[0][0]}{dc\_scaler} \quad (5a)$$

Moreover, Equation (5b) may be used to pre-calculate default DC values for one or more out-of-slice or out-of-frame conditions of neighboring blocks, or where such neighboring blocks are coded as inter blocks, as follows:

$$default_{DC} = \frac{2^{b+2+\alpha}}{dc\_scaler} \quad (5b)$$

Equation (1) may be rewritten as Equation (5c) as follow:

$$(|QF_A[0][0] \cdot 2^\alpha - QF_B[0][0] \cdot 2^\alpha| < |QF_B[0][0] \cdot 2^\alpha - QF_C[0][0] \cdot 2^\alpha|) \quad (5c)$$

Thus, if the inequality of Equation (5c) is true, neighboring block A is selected, and if the inequality of Equation (5c) is not true then neighboring block C is selected. Notably, if any of $QF_{A,B,C}[0][0] \cdot 2^\alpha$ is set equal to the default DC value for a respective neighboring block that is out of the frame or out of the slice, for example as associated with respect to block X, then such a DC default value may have been pre-calculated from Equation (5b) and obtained from a look-up table. Notably, the range of the dc_scaler is related to the current QP selected for both luminance and chrominance.

Returning to the MPEG-4 Part 2 Simple Profile example, where there is a maximum bit depth of 8 bits per pixel, and QP is set to a fixed value in a range of 1 to 31, α is equal to 5. For a hardware implementation, multiplications with the power of 2 are shift operations. Thus, each multiplication of $2^\alpha$ may be implemented using hardware configured for bit shift operations. The default DC values, which are pre-calculated and stored in a look-up table, may be accessed responsive to an address which is the dc_scaler minus the value of 8 in this example. Accordingly, it should be appreciated that neither a divider nor a multiplier need be implemented for this AC-DC prediction. Furthermore, it should be appreciated that above description is applicable to both encoding and decoding. For the overall encoding, division in the quantization may be replaced by a multiplication with the inverse QP to facilitate having a divider free implementation of an encoder. Furthermore, a decoder, which uses an inverse quantization, may essentially be implemented as a multiplication. Regardless of implementation of the overall encoder or decoder, it should be appreciated that an AC-DC prediction portion or inverse AC-DC prediction portion respectively thereof may be realized as without having to implement a divider, as well as without having to implement a multiplier, with regard to such portion.

Figure 6:
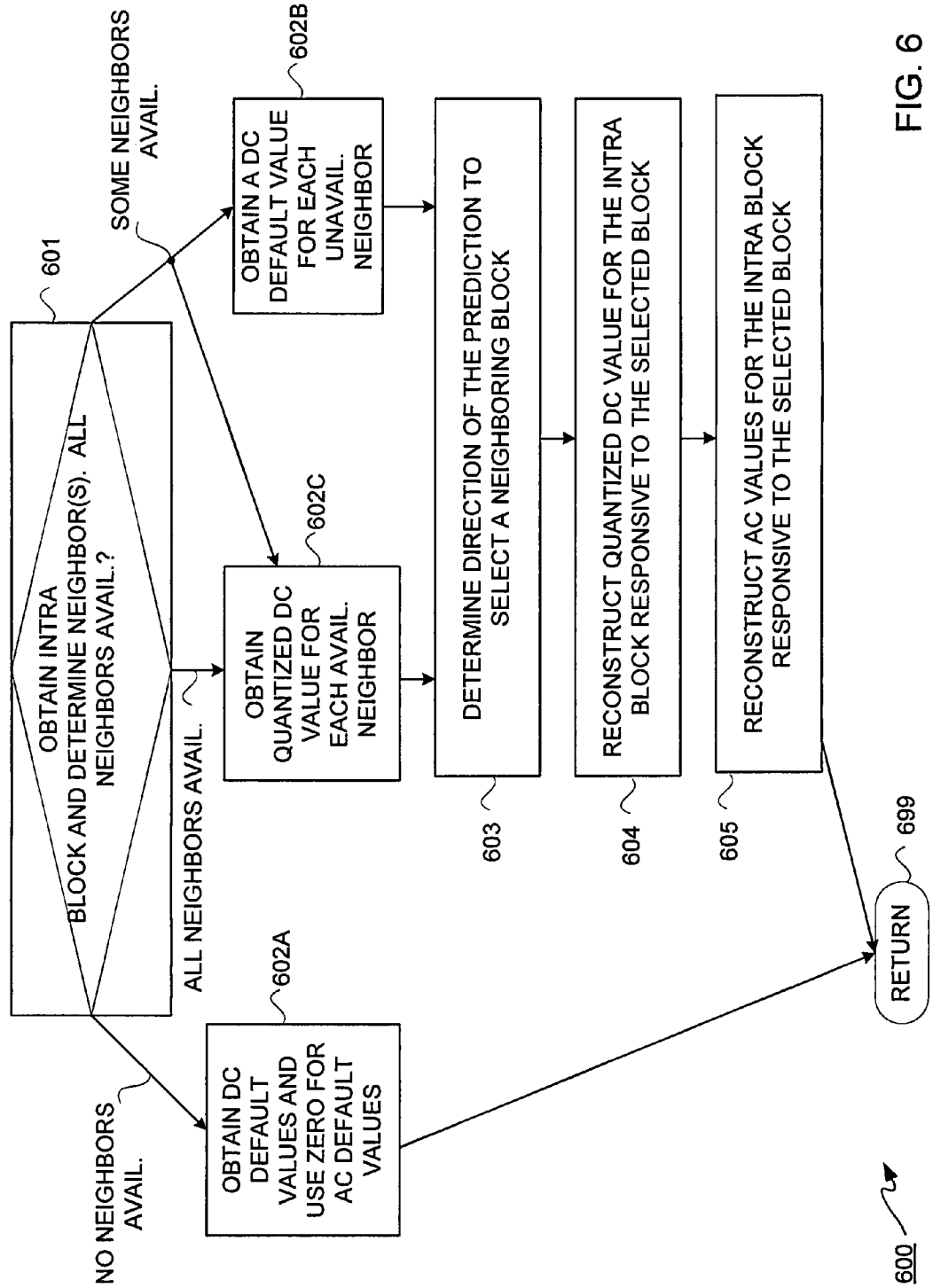
FIG. 6 is flow diagram depicting an exemplary embodiment of an inverse AC-DC prediction flow.

FIG. 6 is flow diagram depicting an exemplary embodiment of an inverse AC-DC prediction flow 600. At 601, an intra block, such as block X of FIG. 5, is obtained, and it is determined what are the neighbors to such intra block and whether any of such neighboring blocks are available. If there are no available neighboring blocks, then at 602A default values are obtained, such as from look-up table memory, for such unavailable neighboring blocks. More particularly, the quantized DC default values are obtained and quantized default AC values are all set to 0 for such unavailable neighboring blocks. From 602A, flow 600 may return at 699 such as for processing another block.

If at 601 it is determined that all neighboring blocks are available, then at 602C all such quantized neighboring block DC values are obtained and a direction of a prediction using the criterion of Equation (5c) is determined. Using the quantized non-default DC values obtained at 602C, a direction of a prediction using the criterion of Equation (5c) is determined at 603.

If it is determined at 601 that only some of the neighboring blocks are available, then one or more default DC values are obtained for each such unavailable neighboring block at 602 (B) with AC default values for each such unavailable neighboring block set to 0, and one or more quantized DC values are obtained for each such available neighboring block at 602C. Using the quantized non-default and default DC values obtained at 602C and 602B, respectively, a direction of a prediction using the criterion of Equation (5c) is determined at 603.

Thus, it should be appreciated that if at least one neighboring block is available at 601, operation 603 may be conducted. However, if no neighboring blocks are available, as determined at 601, then only quantized DC default values are used to reconstruct DC for a first column and a first row of an intra block, and AC values for the first column and the first row of the intra block are all set to 0.

Assuming at least one neighboring block is available for the equation at 603, then the outcome of operation 603 will select a block, namely block A or block C in the above example. Notably, for inverse AC-DC prediction flow 600, a $PQF_X[0][0]$ obtained from the intra block obtained at 601 is added to the quantized DC value obtained, for example at 602B or 602C, for the neighbor selected at 603. At 604, a quantized DC value for block X may be reconstructed by adding $PQF_X[0][0]$ and, for example if block A is selected at 603, $QF_A[0][0]$ obtained at 602B or 602C. Moreover, if block C is selected, then $PQF_X[0][0]$ is added to $QF_C[0][0]$ obtained at 602B or 602C.

At 605, AC values for the intra block obtained at 601, namely block X, are reconstructed responsive to the block selected at 603 using either Equation (4a) or (4b) for a fixed $QP_X$ at least within a slice, if not fixed within a frame. For example, if block A is selected at 603, then AC coefficients are predicted for a first column of block X using Equation (4a). However, if block C is selected at 603, then AC coefficients for the first row of block X are predicted using Equation (4b). After which, flow 600 may return at 699.

While the foregoing describes exemplary embodiments in accordance with one or more aspects of the invention, other and further embodiments in accordance with the one or more aspects of the invention may be devised without departing from the scope thereof, which is determined by the claims that follow and equivalents thereof. Claims listing steps do not imply any order of the steps. Trademarks are the property of their respective owners.

What is claimed is:

1. A method for video encoding or decoding of frames, comprising:
determining availability of neighboring blocks with respect to an intra block, the neighboring blocks including first and second adjacent blocks that are adjacent to the intra block and a diagonal block that is adjacent to the first and second adjacent blocks and diagonal to the intra block;
in response to determining that one or more of the neighboring blocks are unavailable, accessing a DC default value for each unavailable neighboring block;
in response to determining that one or more of the neighboring blocks are available, accessing a respective quantized DC block value for each available neighboring block; and
determining a direction of change for the intra block using predictor values obtained from each DC default value and quantized DC block value;
wherein the determining the direction of change includes:
comparing a first absolute difference to a second absolute difference, wherein:
the first absolute difference is between a DC value of the first adjacent block and a DC value of the diagonal block, and the second absolute difference is between the DC value of the diagonal block and a DC value of the second adjacent block; and
in response to one of the first and second adjacent blocks and the diagonal block being unavailable, the DC value of the unavailable block is the DC default value, and each other of the DC values is the respective quantized DC block value.

2. The method according to claim 1, further comprising:
predetermining the at least one DC default value;
calculating the quantized DC block values; and
storing the at least one DC default value and the quantized DC block values for access thereto.

3. The method according to claim 2, wherein the at least one DC default value and the quantized DC block values are stored in a look-up table.

4. The method according to claim 3, wherein the look-up table is instantiated in programmable logic.

5. The method according to claim 3, wherein the look-up table is instantiated in a memory device.

6. The method according to claim 5, wherein the memory device is embedded in a programmable logic device.

7. The method according to claim 3, further comprising generating an address for the look-up table using a DC scaler, wherein:
the address for accessing the predictor value is associated with the intra block;
the at least one DC default value is predetermined as $(2^{(b+2+\alpha)})$ divided by the DC scaler for $\alpha$ a fixed bit precision value and b a number of bits per pixel;
the DC scaler is for both luminance and chrominance;
the DC scaler is selected from a range responsive to predicted quantized state associated with the intra block; and
the quantized DC block value is previously calculated using the DC scaler and stored in memory.

8. The method according to claim 1, further comprising:
selecting a neighboring block from the neighboring blocks responsive to the direction of change determined;
wherein determining the direction of change comprises:
subtracting a first quantized DC block value of the quantized DC block values from a second quantized DC block value of the quantized DC block values to obtain a first absolute value difference,
subtracting a third quantized DC block value of the quantized DC block values from the second quantized DC block value of the quantized DC block values to obtain a second absolute value difference, and
comparing the first absolute value difference to the second absolute value difference; and
wherein the first quantized DC block value, the second quantized DC block value, and the third quantized DC block value are the predictor values and are respectively associated with a first block, a second block, and a third block of the neighboring blocks that are nearest neighbors of the intra block.

9. The method according to claim 8, wherein:
the first quantized DC block value, the second quantized DC block value, and the third quantized DC block value are each in a frequency domain;
the first quantized DC block value, the second quantized DC block value, and the third quantized DC block value are each multiplied by a bit precision value of $2\hat{}\alpha$ for $\alpha$ a fixed bit precision value for the comparing;
the comparing is implemented as a less than operation;
the first block is a left-side block to the intra block;
the second block is a top-left corner block to the intra block; and
the third block is a top-side block to the intra block.

10. The method according to claim 8, wherein the intra block has a fixed quantization parameter within at least a slice of a frame.

11. The method according to claim 10, wherein the frame is selected from a group consisting of I-frames and P-frames and is for a Simple Profile according to MPEG-4 Part 2.

12. The method according to claim 10, wherein the frame is selected from a group consisting of I-frames, P-frames, and B-frames, and is for an Advanced Simple Profile according to MPEG-4 Part 2.

13. The method according to claim 10, further comprising:
obtaining predicted quantized values for the intra block;
reconstructing a quantized DC value for the intra block by adding a DC component of the predicted quantized values for the intra block to either the first quantized DC block value or the third quantized DC block value responsive to the neighboring block selected; and
reconstructing quantized AC values for the intra block by adding predicted quantized AC components of the predicted quantized values to corresponding quantized AC components associated with the neighboring block selected without having to perform a division operation responsive to the quantization parameter being fixed.

14. The method according to claim 13, wherein reconstruction of the quantized AC values and the quantized DC value is associated with either a first column or a first row of the intra block for video texture decoding of the intra block.

15. The method according to claim 10, further comprising:
obtaining quantized values for the intra block;
generating a predicted quantized DC value for the intra block by subtracting from a DC component of the quantized values for the intra block either the first quantized DC block value or the third quantized DC block value responsive to the neighboring block selected; and
generating predicted quantized AC values for the intra block by subtracting from quantized AC components of the quantized values for the intra block corresponding quantized AC components associated with the neighboring block selected,
wherein the predicted quantized AC values and the predicted quantized DC value in combination are predicted quantized values for the intra block and are predicted without having to perform a division operation responsive to quantization within the frame associated with the intra block being fixed.

16. The method according to claim 15, wherein generation of the predicted quantized AC values and the predicted quantized DC value is associated with either a first column or a first row of the intra block for video texture encoding to provide the intra block.

17. A decoder for moving picture decoding, comprising:
storage having quantized DC block values and quantized AC block values for blocks of slices associated with frames and having default DC values, the quantized AC block values being for at least either a bordering row or a bordering column to an intra block; and
an inverse AC-DC predictor configured to receive predicted quantized values in a frequency domain and in response thereto to provide quantized values in the frequency domain, the predicted quantized values being associated with the intra block,
wherein the inverse AC-DC predictor is configured at least in part to:
determine availability of nearest neighbor blocks of the intra block;
obtain the default DC values and set AC values to default value 0 in response to determining that no nearest neighbor blocks are available;
in response to determining that at least one nearest neighbor block is available:
obtain a first quantized DC block value, a second quantized DC block value, and a third quantized DC block value for the nearest neighbor blocks, wherein for each nearest neighbor block that is available the quantized DC block value is obtained from the quantized DC block value respectively associated with that nearest neighbor block, and in response to each nearest neighbor block that is unavailable, setting the quantized DC block value to a default DC value;
determine a first absolute value difference between the first quantized DC block value and the second quantized DC block value;
determine a second absolute value difference between the second quantized DC block value and the third quantized DC block value;
select a nearest neighbor block from a portion of the nearest neighbor blocks responsive to whether the first absolute value difference is less than the second absolute value difference indicating a predictable change in direction in the frequency domain;
reconstruct a quantized DC value for the intra block by adding either the first quantized DC block value or the third quantized block value responsive to the nearest neighbor block selected to a predicted quantized DC value of the predicted quantized values; and
reconstruct quantized AC values for the intra block by adding the quantized AC block values for either the bordering row or the bordering column of the nearest neighbor block selected for either a first row or a first column of predicted quantized AC values, respectively, of the predicted quantized values without having to perform a division operation responsive to a fixed quantization parameter of either a slice or a frame in which the intra block is located.

18. The decoder according to claim 17, wherein the inverse AC-DC predictor is further configured to multiply each of the first quantized DC block value, the second quantized DC block value, and the third quantized DC block value by a bit precision value of $2\hat{}\alpha$ for $\alpha$ a fixed precision value.

19. An encoder for moving picture encoding, comprising:
storage having quantized DC block values and quantized AC block values for blocks of slices associated with frames and having default DC values, the quantized AC block values being for at least either a bordering row or a bordering column to an intra block; and an AC-DC predictor configured to receive quantized values in a frequency domain and in response thereto to provide predicted quantized values in the frequency domain, the predicted quantized values being for the intra block, wherein the AC-DC predictor is configured at least in part to:

determine availability of nearest neighbor blocks of the intra block;

obtain the default DC values and set AC values to default value 0 in response to determining that no nearest neighbor blocks are available;

in response to determining that at least one nearest neighbor block is available:

obtain a first quantized DC block value, a second quantized DC block value, and a third quantized DC block value for the nearest neighbor blocks, wherein for each nearest neighbor block that is available the quantized DC block value is obtained from the quantized DC block value respectively associated with that nearest neighbor block, and in response to each nearest neighbor block that is unavailable, setting the quantized DC block value to a default DC value;

determine a first absolute value difference between the first quantized DC block value and the second quantized DC block value;

determine a second absolute value difference between the second quantized DC block value and the third quantized DC block value;

select a nearest neighbor block from a portion of the nearest neighbor blocks responsive to whether the first absolute value difference is less than the second absolute value difference indicating a predictable change in direction in the frequency domain;

generate a predicted quantized DC value for the intra block by subtracting either the first quantized DC block value or the third quantized DC block value responsive to the nearest neighbor block selected from a quantized DC value of the intra block; and generate predicted quantized AC values for the intra block by subtracting the quantized AC block values for either the bordering row or the bordering column of the nearest neighbor block selected for either a first row or a first column of quantized AC values, respectively, of the intra block without having to perform a division operation responsive to a fixed quantization parameter of either a slice or a frame in which the intra block is located.

20. The encoder according to claim 19, wherein the AC-DC predictor is further configured to multiply each of the first quantized DC block value, the second quantized DC block value, and the third quantized DC block value by a bit precision value of $2^\alpha$ for $\alpha$ a fixed precision value.

* * * * *